United States Patent
Jadidian et al.

(10) Patent No.: US 10,164,469 B1
(45) Date of Patent: Dec. 25, 2018

(54) ADAPTIVE WIRELESS POWER TRANSFER SYSTEM

(71) Applicant: Apple Inc., Cupertino, CA (US)

(72) Inventors: Jouya Jadidian, Saratoga, CA (US);
Steven W. Cabral, San Jose, CA (US);
Vaneet Pathak, Los Altos, CA (US)

(73) Assignee: Apple Inc., Cupertino, CA (US)

(*) Notice: Subject to any disclaimer, the term of this patent is extended or adjusted under 35 U.S.C. 154(b) by 121 days.

(21) Appl. No.: 15/265,061

(22) Filed: Sep. 14, 2016

Related U.S. Application Data (60) Provisional application No. 62/233,880, filed on Sep. 28, 2015.

(51) Int. Cl.
*H02J 50/10* (2016.01)
*H02J 50/60* (2016.01)
*H02J 50/90* (2016.01)

(52) U.S. Cl.
CPC .............. *H02J 50/10* (2016.02); *H02J 50/60* (2016.02); *H02J 50/90* (2016.02)

(58) Field of Classification Search
CPC .. H02J 17/00; H02J 50/10; H02J 50/60; H02J 50/90
See application file for complete search history.

(56) References Cited

U.S. PATENT DOCUMENTS

| | | |
|---|---|---|
| 8,115,448 B2 | 2/2012 | John |
| 8,922,066 B2 | 12/2014 | Kesler et al. |
| 2009/0230777 A1 | 9/2009 | Baarman et al. |
| 2010/0033021 A1* | 2/2010 | Bennett ................ H02J 17/00 307/104 |
| 2010/0181961 A1 | 7/2010 | Novak et al. |
| 2010/0201201 A1 | 8/2010 | Mobarhan et al. |
| 2011/0136550 A1 | 6/2011 | Maugars |
| 2011/0254503 A1 | 10/2011 | Widmer et al. |
| 2012/0235636 A1 | 9/2012 | Partovi |
| 2015/0365137 A1 | 12/2015 | Miller et al. |

* cited by examiner

*Primary Examiner* — Robert Deberadinis
(74) *Attorney, Agent, or Firm* — Treyz Law Group, P.C.; G. Victor Treyz; Michael H. Lyons (57) ABSTRACT

Wireless power may be transferred using wireless power elements such as coil antennas for inductive wireless power transfer technology or patch antennas for capacitive wireless power transfer technology. These antennas in source equipment may couple in a near-field region to antennas implemented in target equipment. Wireless power may also be transferred from the source equipment to the target equipment using radiating antennas in their far-field regions. Wireless power transfer may be optimized by performing channel estimation operations. Foreign objects can be detected and located using sensors or by analyzing the quality of wireless channels. Optimum power transfer settings may be used to maximize wireless power transfer to a set of the antennas in the target equipment while minimizing power transfer to the foreign object.

19 Claims, 5 Drawing Sheets

ADAPTIVE WIRELESS POWER TRANSFER SYSTEM

CROSS-REFERENCE TO RELATED APPLICATIONS

This application claims the benefit of U.S. Provisional Patent Application Ser. No. 62/233,880, filed Sep. 28, 2015, which is hereby incorporated by reference herein in its entirety.

BACKGROUND

This relates generally to power transfer systems and, more particularly, to systems that transfer power wirelessly.

It is often desirable to transfer power between a source of power and equipment that requires power. In some systems, a user must manually plug a power cable into equipment that requires power. In other systems, power cables can be eliminated by transferring power wirelessly.

Challenges may arise in using wireless power transfer systems effectively. Alignment issues and other issues may make wireless power transfer systems cumbersome and inefficient.

It would therefore be desirable to be able to provide improved systems for transferring power wirelessly to equipment that uses power.

SUMMARY

Equipment that contains a source of power such as a wireless power transfer unit or other source equipment may transfer power wirelessly to target equipment. The wireless power transfer unit may contain an array of wireless power transfer elements. The target equipment may be a vehicle or other equipment that includes a corresponding array of wireless power transfer elements.

The wireless power transfer elements (sometimes referred to as antennas, wireless power transmitter elements when transmitting wireless power, and wireless power receiver elements when receiving wireless power) may be coil antennas or other antennas that support inductive wireless power transfer, may be capacitor plates that support capacitively coupled wireless power transfer, may be antennas that support far-field wireless power transfer, or may be any other type of antenna structure. During wireless power transfer operations, the antennas in the source equipment may transfer power to the antennas in the target equipment using near-field coupling or far-field signal propagation. This allows wireless power to be transferred from the source equipment to the target equipment.

Wireless power transfer may be optimized by controlling the signals supplied to the wireless power transfer elements. For example, the signal strengths of the wireless power signals supplied to different wireless power transfer elements can be controlled to direct a beam of wireless power signals towards an appropriate set of the wireless power transfer elements in the target equipment. The optimum settings to use in supplying signals to the wireless power transfer elements (e.g., signal strengths for each of the antennas in an array of antennas) may be determined by performing channel estimation measurements. During channel estimation, the characteristics of signal propagation between transmitter and receiver such as power decay with distance, scattering, and fading may be determined. Channel estimation may be performed by gathering information at a wireless power receiver associated with one antenna while transmitting information with the wireless power transmitter associated with another antenna. Channel estimation may also be performed by making impedance measurements while transferring power between antennas.

Channel estimation information may be used to control beamforming operations with the antennas during inductive wireless power transfer. Foreign objects can also be detected and located using sensors. Using channel estimation information and foreign object location information, optimum power transfer settings may be identified and used to maximize wireless power transfer to a set of the antennas in the target equipment while minimizing power transfer to a foreign object.

In some situations, one or more transmitters in the target equipment may transmit signals through one or more of the antennas in the target equipment while power is being wirelessly transferred from the antennas in the source equipment to remaining antennas in the target equipment. This type of arrangement may help optimize wireless power transfer (e.g., by minimizing power transfer to with foreign objects while maximizing power transfer to target antennas).

Further features will be more apparent from the accompanying drawings and the following detailed description.

DETAILED DESCRIPTION

It may be desirable to transfer power wirelessly from a first piece of equipment to a second piece of equipment. The first piece of equipment may be, for example, a stationary or mobile wireless power transfer unit (sometimes referred to as source equipment, a wireless power source, a wireless power transfer system, or a source device). The second piece of equipment, which may sometimes be referred to as target electronic equipment or a target device, may be a computer or other electronic device, may be an electric vehicle or other mobile electronic equipment, may be an appliance, may be lighting or other stationary electronic equipment, or may be any other suitable electronic equipment. The power that is wirelessly transferred to the target equipment may be used to recharge a battery in the target equipment or to power other circuitry in the target equipment. Configurations in which the target equipment is an electric vehicle and in which power is provided wirelessly from a wireless power transfer unit to the vehicle to recharge a battery in the vehicle may sometimes be described herein as an example.

Figure 1:
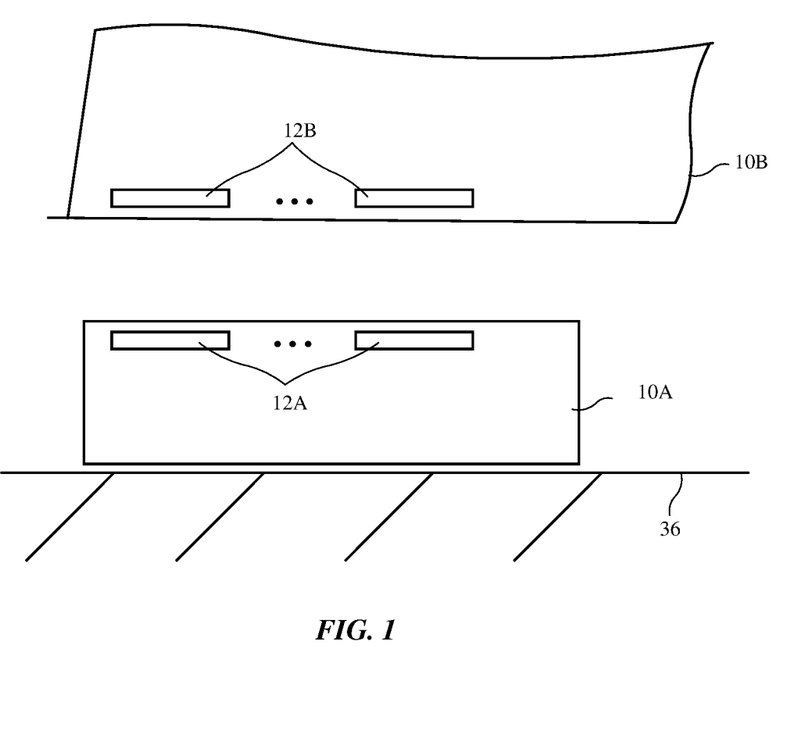
FIG. 1 is a diagram of a wireless power transfer system in accordance with an embodiment.

An illustrative system that includes target equipment and source equipment for providing power to the target equipment is shown in FIG. 1. As shown in FIG. 1, source equipment 10A may rest on a surface such as surface 36.

Surface 36 may be the floor of a garage or other suitable surface. Source equipment 10A may include wheels, a motor, and control circuitry for moving equipment 10A to a desired location on surface 36 (e.g., to a position under target equipment 10B that allows equipment 10A and 10B to be aligned with each other) or source equipment 10A may be stationary equipment such as a wireless charging pad (mat) resting on surface 26.

Source equipment 10A and target equipment 10B may each contain one or more antennas or other wireless power transfer elements such as elements 12A in equipment 10A and elements 12B in target equipment 10B. Wireless power may be transferred between equipment 10A and 10B using inductive techniques, capacitively coupled capacitor plates, near-field coupled antennas operating at microwave frequencies or other frequencies, or other wireless power transfer techniques. For example, wireless power transfer elements 12A and 12B may be inductively coupled (near-field coupled) coil antennas (e.g., coils such as loop antennas with multiple turns) or may be capacitor electrodes that are capacitively near-field coupled. When current is applied through a loop in the source equipment, a magnetic field is produced that induces a corresponding current in the loop of the target equipment. Electric fields may be produced using capacitor electrodes. Other types of wireless power transfer elements such as radiating antenna elements (operating in a far-field region) may be used, if desired.

Elements 12A and/or 12B may form arrays of elements. Power and, if desired, communications signals may be transmitted and/or received by elements 12A and 12B of the arrays. Near-field wireless or far-field signals can be emitted and/or received, so array-based systems of the type shown in FIG. 1 may sometimes be referred to as near-field or far-field multiple-input-multiple-output wireless power transfer systems. By controlling the signals supplied to the elements of the arrays, beamforming operations may be performed (i.e., wireless power can be steered in a desired direction), allowing power transfer efficiency to be enhanced in real time without needing to physically move equipment 10A and 10B after initial alignment. Wireless power nulls (areas characterized by minimums in wireless power) can also be steered using beamforming operations to ensure that more power than desired is not directed towards foreign objects.

Figure 2:
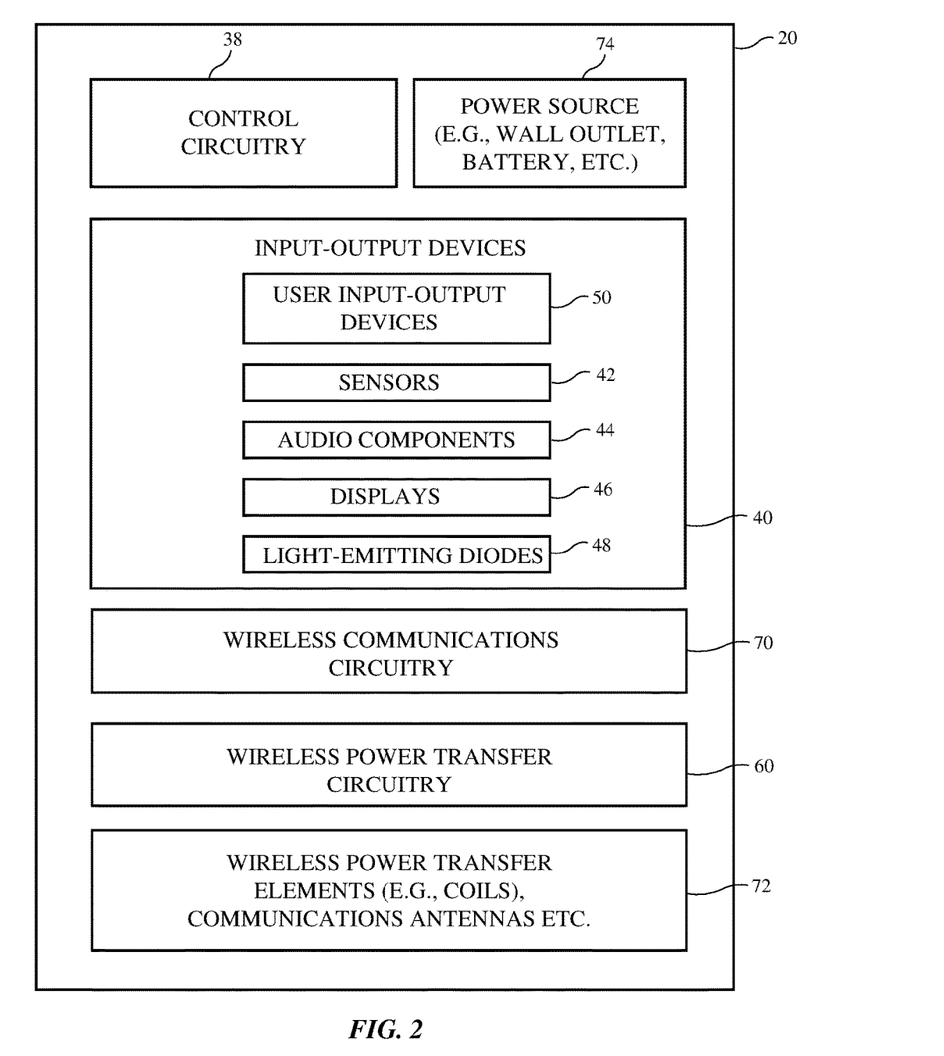
FIG. 2 is a schematic diagram of illustrative circuitry of the type that may be used in equipment that transmits wireless power and equipment that receives wireless power in accordance with an embodiment.

A schematic diagram of illustrative circuitry 20 that may be provided in source equipment 10A and/or target equipment 10B is shown in FIG. 2. As shown in FIG. 2, circuitry 20 may include control circuitry 38. Control circuitry 38 may include microprocessors, memory (e.g., volatile and nonvolatile storage), application-specific integrated circuits, and other storage and processing circuitry. Code that is implemented on control circuitry 38 may be used in implementing control processes for equipment 10A and 10B. These control processes may be used in analyzing sensor data and other input (e.g., to identify the location of any foreign objects in the vicinity of equipment 10A and 10B) and in controlling each of the signals being transmitted and received with the respective elements 12A and 12B of the arrays. Signal adjustments such as these may be made by control circuitry 38 in real time to adjust the location of maximum energy distribution (signal strength maximums) and minimum energy distribution (nulls). For example, signal adjustments may be used to ensure that wireless power transfer operations between elements 12A and 12B are being performed efficiently by source wireless power transfer circuitry 60 and other source circuitry 20 in source equipment 10A and by target wireless power transfer circuitry 60 and other target circuitry 20 while this circuitry aligns nulls with any foreign objects that are detected in the vicinity of equipment 10A and 10B.

Input-output devices 40 may be used in gathering input from a user and/or making measurements on the environment surrounding equipment 10A and 10B and/or may be used in supplying output to a user and/or equipment in the vicinity of equipment 10A and 10B. Control circuitry 38 may process the information obtained by input-output devices 40 and may provide input-output devices 40 with output.

Input-output devices 40 may include user input-output devices 50. Devices 50 may include buttons, touch sensors, track pads, keyboards, and other components for receiving input from a user. Sensors 42 may be used in gathering information in connection with alignment operations (e.g., information associated with aligning equipment 10A and equipment 10B), information associated with detecting foreign objects and determining the location of foreign objects, and/or receiving user input. Sensors 42 may include light-based sensors for detecting ambient light, light-based proximity sensors for detecting objects in the vicinity of equipment 10A and 10B, magnetic sensors, temperature sensors, lidar sensors, radar sensors, accelerometers and other position and/or motion sensors, acoustic sensors, gas sensors, humidity sensors, cameras (e.g., visible, infrared, and/or ultraviolet image sensors), compasses, and other sensors. Audio components 44 may include speakers and other components for producing audio output and acoustic sensors such as microphones for gathering input from a user (e.g., voice commands) and/or for measuring ambient sounds. Displays 46 may include touch screens and/or displays that are insensitive to touch. Light-emitting diodes, lamps, lasers, and other light-emitting devices 48 may be used to provide a user with output and/or may be used as part of a sensor system (e.g., a system that identifies the location of equipment 10A, equipment 10B, or other objects).

Circuitry 20 may include wireless communications circuitry such as wireless communications circuitry 70. Wireless communications circuitry 70 may be used to transmit and/or receive radio-frequency wireless signals (e.g., Bluetooth® signals, WiFi® signals, other wireless signals, etc.), light-based wireless signals, and/or other wireless signals. Data may also be communicated over wired paths. Wireless communications circuitry 70 and wireless power transfer circuitry 60 may use wireless power transfer elements such as elements 12A and 12B and other antennas 72 and in transmitting and receiving wireless signals. For example, wireless communications circuitry 70 may use antenna such as inverted-F antennas, monopole antennas, loop antennas, patch antennas, dipole antennas, planar inverted-F antennas, slot antennas, and other antennas in transmitting and receiving wireless communications signals at radio-frequencies (e.g., at frequencies of 700 MHz to 5 GHz, at wireless local area network frequencies such as 2.4 GHz or 5 GHz, at frequencies below 700 MHz or above 5 GHz, or at other suitable frequencies). In some configurations, circuitry 70 and/or 60 may transmit and/or receive near field signals (e.g., near field wireless power transfer signals at frequencies below 5 GHz, below 1 GHz, below 100 MHz, below 1 MHz, below 100 kHz, above 1 kHz, or other suitable frequencies).

Equipment 10A may include some or all of circuitry 20 of FIG. 2 or other suitable circuitry, equipment 10B may include some or all of circuitry 20 of FIG. 2 or other suitable circuitry, or both equipment 10A and equipment 10B may include some or all of circuitry 20 or other suitable circuitry.

By controlling the signals provided to the wireless power transfer elements, the location and concentration of power associated with wirelessly transmitted power may be controlled. Optimal charging conditions may be determined based on sensor measurements, may be based on channel estimation measurements (e.g., measurements in which wireless signal paths between different combinations of elements 12A and 12B are evaluated), may be based on the known locations of receiving elements (e.g., some or all of elements 12B in target equipment 10B), and may be based on the location of any detected foreign objects (i.e., external objects to which it is not desired to couple power during wireless power transfer operations).

Figure 3:
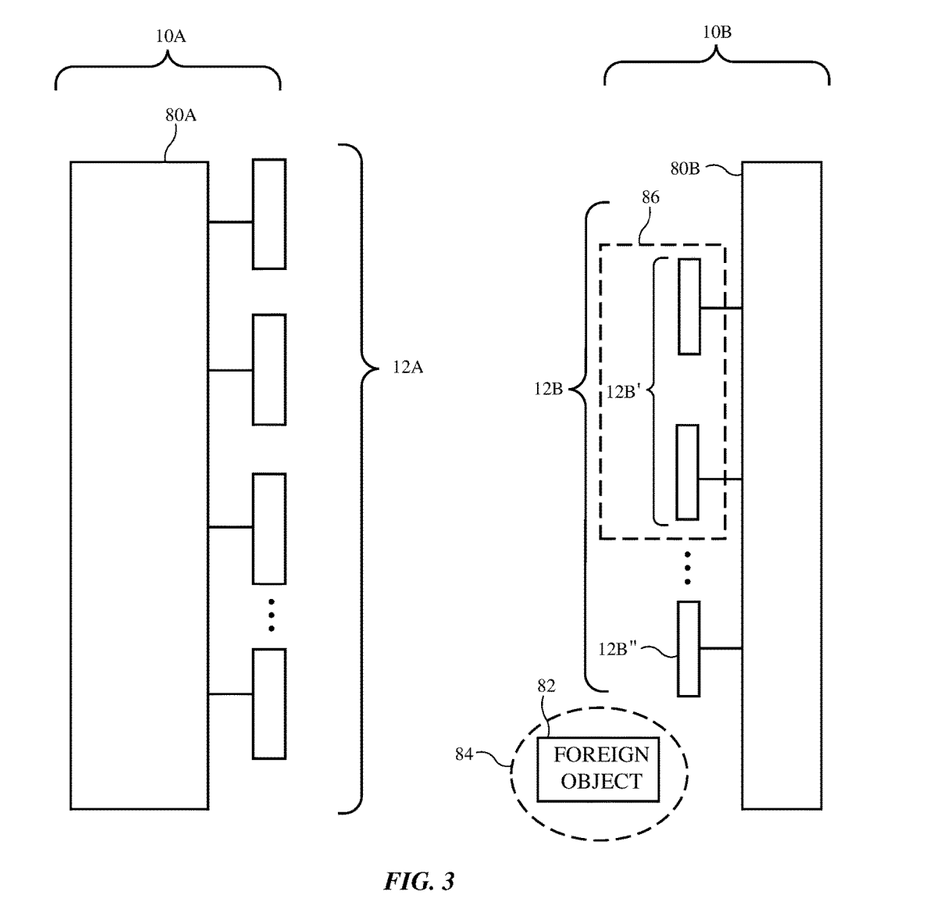
FIG. 3 is a diagram of illustrative power transfer equipment that may be used in transferring power wirelessly in accordance with embodiments.

An illustrative wireless power transfer arrangement is shown in FIG. 3. As shown in FIG. 3, source equipment 10A may have circuitry 80A (e.g., wireless power transfer circuitry and, if desired, wireless communications circuitry) coupled to a single power transfer element 12A or an array of power transfer elements 12A. Target equipment 10B may have circuitry 80B (e.g., wireless power transfer circuitry and, if desired, wireless communications circuitry) coupled to a single power transfer element 12B or an array of power transfer elements 12B. Elements 12A and 12B may be, for example, coil antennas and may be inductively coupled to support near-field inductive charging of a battery within equipment 12B from power supplied by equipment 12A, may be capacitor electrode that are capacitively coupled to support wireless charging of the battery, or may be far-field antenna elements that transfer power wirelessly to support wireless charging of the battery.

When using an array of antennas or other collection of wireless power transfer elements, it is possible to adjust the signals transmitted by each element to create a desired power transfer beam (e.g., the phase and magnitude and/or other signal properties of the signal associated with each of the elements may be controlled to direct power transfer to a desired target location and away from other locations). As an example, circuitry 80A may provide an appropriate set of signals to the array of elements 12A in equipment 10A to shape the signals that are emitted by elements 12A in a desired pattern that overlaps the array of elements 12B (or a desired subset of these elements) in equipment 10B. By using near-field field shaping or far-field beamforming principals in this way, wireless power can be efficiently transferred between antenna elements 12A and an appropriate set of antenna elements 12B, even in scenarios in which equipment 10A and 10B is not precisely aligned.

When equipment 10A and/or 10B detects a foreign object such as foreign object 82, it can use near-field shaping or far-field beamforming to place a global or local signal strength minimum (null) over the foreign object. In some examples, equipment 10A and/or 10B uses sensors 42 or other circuitry 20 to detect foreign objects. In this way, equipment 10A and/or 10B can maintain the field strength at the foreign object is at a desired level during wireless power transfer operations. The process of identifying optimum wireless power transfer setting for equipment 10A and 10B may involve satisfying criteria related to efficient power transfer while satisfying criteria related to avoiding excess signal strength in the vicinity of foreign objects such as object 82.

In some scenarios, all of elements 12A are used for signal transmission and all of elements 12B are used for signal reception (e.g., to convert the received wireless signals into direct current power for use in equipment 10B). In other scenarios, one or more of elements 12B may be used to transmit signals while elements 12A are transmitting signals to element 12B as part of a wireless power transfer process. The signals produced by the one or more transmitting elements 12B help equipment 10A and 10B produce a desired field pattern. With this type of arrangement, one or more of elements 12B in target equipment 10B may be used to transmit signals at the same time that other elements 12B in target equipment 10B are receiving wirelessly transmitted power. The overall beamforming operation that is performed by using elements 12A and one or more of elements 12B as transmitters may be able to direct power to a desired subset of elements 12B while avoiding foreign objects more satisfactorily than if all of elements 12B were only used as receivers.

In the illustrative example of FIG. 3, wireless power transmission circuitry in circuitry 80A and 80B is transmitting wireless power signals using all of elements 12A in equipment 10A and using element 12B" in equipment 10B. This creates a near-field or far-field pattern (depending on the technology used) that is concentrated in maximum power region 86 and that has a minimum in null region 84. Wireless power transfer elements 12B' are being used to receive power for equipment 10B. Because maximum power region 86 overlaps elements 12B', power can be efficiently transferred from elements 12A of equipment 10A to elements 12B' of equipment 10B. Because null region 84 overlaps foreign object 82, foreign object 82 will not be exposed to unnecessarily elevated signal strengths (i.e., potential disruption to wireless power transfer operations from the presence of conductive materials or other structures in object 82 will be reduced).

In the example of FIG. 3, an optimum wireless power transfer scenario is illustrated in which all of elements 12A and element 12B" are being used to produce a field pattern with an elevated field strength in region 86 overlapping elements 12B' in target equipment 10 and a reduced (e.g., null) field strength in null region 84 overlapping foreign object 82. Other optimum wireless power transmission scenarios may involve different patterns of transmitting and receiving wireless power transfer elements. As an example, wireless power can be concentrated in a region such as region 86 that overlaps all of receiving elements 12B, wireless power can be minimized in region 84 even if maximum power region 86 does not coincide with elements 12B, wireless power can be patterned by transmitting signals with a subset of elements 12A, wireless power can be patterned by using two or more of elements 12B to transmit signals while transmitting wireless power with elements 12A during wireless transfer operations, multiple null regions 84 may be produced and each aligned with a respective foreign object 82, and/or other wireless power transfer arrangements may be used. The configuration of FIG. 3 is merely illustrative.

Figure 4:
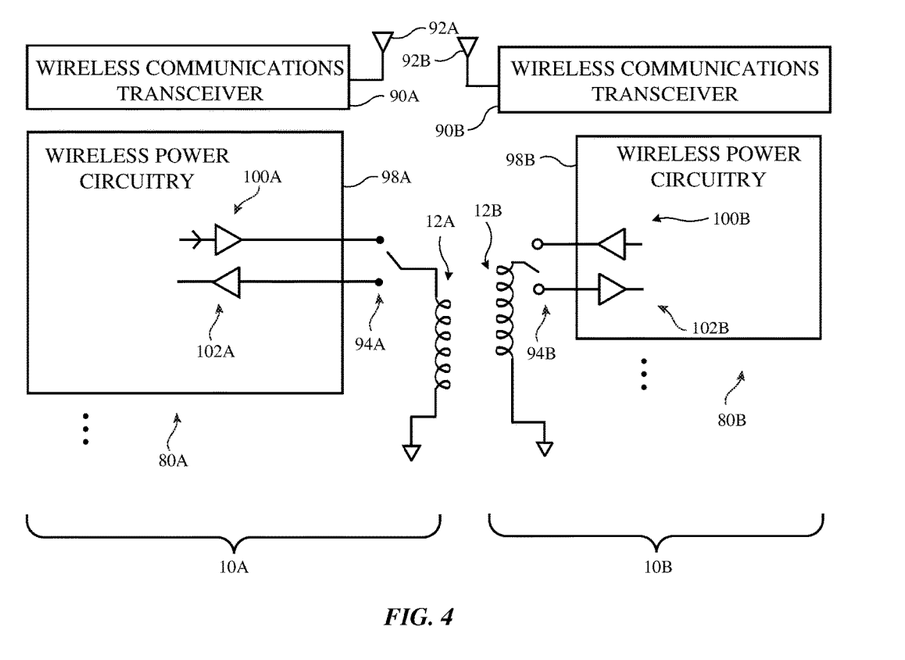
FIG. 4 is a diagram showing illustrative circuitry that may be used in a system of the type shown in FIG. 3 in accordance with an embodiment.

Illustrative circuitry 80A and 80B that may be used in equipment 10A and 10B is shown in FIG. 4. As shown in FIG. 4, equipment 10A may include wireless communications transceiver circuitry 90A coupled to antenna 92A and equipment 10B may include wireless communications transceiver 90B coupled to antenna 92B. Transceiver circuitry 90A and 90B may operate at frequencies in cellular telephone communications bands, wireless local area network communications bands, or other communications bands. Equipment 10A and 10B may communicate using a wireless link established using circuitry 90A and 90B.

Circuitry 80A and 80B may also include wireless power transceiver circuitry 98A and 98B, respectively. Switching circuitry such as switch 94A may be used to selectively couple wireless power transmitter 100A or wireless power receiver 102A of circuitry 98A to element 12A. There may be multiple elements 12A in equipment 10A, each with a respective wireless power circuit 98A and switching circuit 94A. Switching circuitry such as switch 94B may be used to selectively couple wireless power transmitter 100B or wireless power receiver 102B in wireless power circuitry 98B to element 12A. There may be multiple elements 12B in equipment 10B, each with a respective wireless power circuit 98B and switching circuit 94B.

Channel estimation operations may be performed using circuitry 80A and 80B. With one illustrative approach, all transmitters 100A and 100B and all receivers 102A and 102B are turned off. Each transmitter and receiver is then turned on systematically until signal transmission across the channel associated with each possible transmitter-receiver pair (or at least a representative selection of these pairs) has been measured. Signals received at the receivers can be transmitted back to the equipment of the transmitters using transmitters in circuits 98A and 98B or using transceiver circuitry such as transceiver circuitry 90A and 90B. If desired, channel estimation can also be performed using a passive receiver arrangement. With this approach, each receiver acts passively and does not measure or communicate channel information to the equipment of the transmitter. Instead, the transmitter circuitry is used to measure near-field channel parameters for beamforming by measuring the reflected impedance that each of the receivers imposes on each of the transmitters. Based on these channel measurements or any other suitable channel estimation measurements, and, if desired, information on the location of any foreign objects, optimal settings for circuitry 80A and 80B can be obtained and used for power transfer operations.

Figure 5:
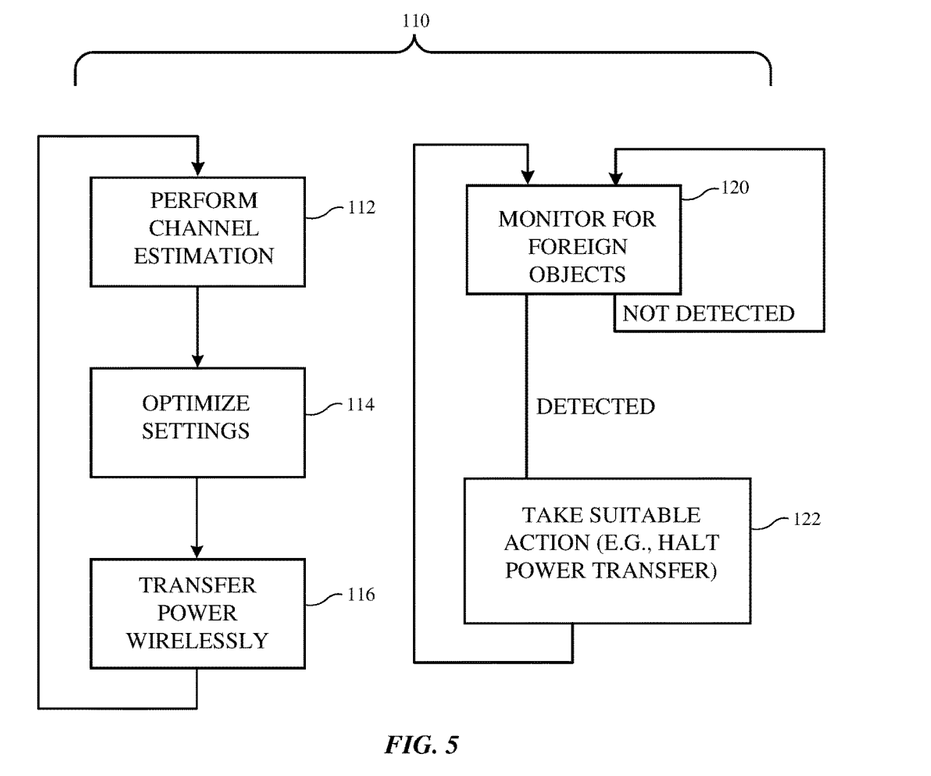
FIG. 5 is a flow chart of illustrative steps involved transferring power wirelessly in accordance with an embodiment.

Illustrative operations associated with using near-field beamforming techniques to optimize wireless power transfer between equipment 10A and 10B is shown in FIG. 5. Operations 110 may take place concurrently. During the operations of blocks 120 and 122, equipment 10A and/or 10B may monitor for foreign objects and take appropriate action. During the operations of blocks 112, 114, and 116, equipment 10A and/or 10B may be configured to transfer power effectively without directing excess power towards the foreign objects.

At block 120, equipment 10A and/or 10B may use sensors 42 and other circuitry 20 to monitor for the presence of foreign objects. If no foreign objects are detected, processing can loop back to block 120 for additional monitoring. If foreign objects are detected, appropriate action can be taken during block 122. Examples of action that may be taken when foreign objects are detected include issuing an audible or visible alert, transmitting a wireless message to a user of the wireless power transfer system, halting the transfer of wireless power until a user can inspect and manually restart the system, reducing the amount of power that is being wirelessly transferred (e.g., placing the system in a low power mode), or otherwise adjusting power transfer operations, issuing alerts and other messages, etc. The location of each foreign object that is detected during the operations of block 120 may, if desired, be supplied to equipment 10A and/or 10B (e.g. wirelessly, through internal connections, etc.).

To ensure that power is transferred efficiently, channel estimation operations may be performed at block 112. For example, equipment 10A and 10B may cycle through each of the transmitters and receivers associated with equipment 10A and 10B, turning on each possible transmitter-receiver pair and making a corresponding channel measurement. The transmitters and receivers that are used in making the channel measurements may be the same transmitters and receivers used in transferring power wirelessly or may be low-power transmitters and/or receivers that are switched into use with switching circuitry 94A and 94B. Channel measurements may also be made by measuring reflected impedances that the receiver circuitry imposes on the transmitter circuitry (e.g., by measuring the impedances associated with conveying signals using different pairs of near-field coupled coil antennas and/or sets of coil antennas). During channel estimation, the characteristics of signal propagation between each of the transmitters and receivers associated with equipment 10A and 10B may be determined (e.g., power decay with distance, scattering, and fading). With one illustrative technique, a training sequence approach may be used in estimating channel state information. A known training sequence may be transmitted and the training sequence and received signal information from the receivers may be used in estimating channel parameters.

Channel estimation data from the operations of block 112 and foreign object location information from block 120 may be used in determining optimum wireless power transfer settings at block 114. Wireless power transfer settings may involve settings for transmitters in equipment 10A and, if desired, one or more transmitters in equipment 10B (e.g., to help locate nulls over foreign objects). Control circuitry in equipment 10A and/or equipment 10B may be used in identifying optimum settings.

At block 116, power can be transferred wirelessly from equipment 10A to equipment 10B using the optimum settings identified at step 114. For example, wireless power circuitry in equipment 10A can provide signals to elements 12A that are wirelessly transmitted via near-field inductive coupling, near-field capacitive coupling, or far-field radiation to some or all of elements 12B in equipment 10B. One or more of elements 12B may optionally be used to transmit signals while power is being transferred from elements 12A to the remainder of elements 12B (e.g., to help align nulls or other areas of low power over foreign objects and/or to enhance power transfer efficiency). For example, when one or more target elements 12B are desired for use in null formation, one or more of switches 94B can be configured to couple one or more respective wireless transmitters 100B to one or more respective elements 12B to transmit wireless power. At other times, when, for example, a foreign object moves out of the vicinity of equipment 10A and 10B, switches 94B can be reconfigured so that the same elements 12B are coupled to wireless power receivers 102B. In this configuration, wireless power may be received by these target elements 12B. The operations of block 112, 114, and 116 can be performed continuously (e.g., in a loop) during operation of equipment 10A and 10B.

Operations 110 may be performed by control circuitry 38 in equipment 10A and/or 10B. During operation, this control circuitry (which may sometimes be referred to as processing circuitry, processing and storage, computing equipment, a computer, etc.) may be configured to perform the method of FIG. 5 (e.g., using dedicated hardware and/or using software code running on hardware in equipment 10A and/or 10B such as control circuitry 38). The software code for performing these methods, which may sometimes be referred to as program instructions, code, data, instructions, or software, may be stored on non-transitory (tangible) computer readable storage media in control circuitry 38 in equipment 10A and/or 10B such as read-only memory, random-access memory, hard drive storage, flash drive storage, removable storage medium, or other computer-readable media and may be executed on processing circuitry such as microprocessors and/or application-specific integrated circuits with processing circuits in control circuitry 38.

The foregoing is merely illustrative and various modifications can be made by those skilled in the art without departing from the scope and spirit of the described embodiments. The foregoing embodiments may be implemented individually or in any combination.

What is claimed is:

1. A system in which power is transferred wirelessly in the vicinity of a foreign object, comprising:
   source equipment having an array of source wireless power transfer elements and having source wireless power transfer circuitry; and
   target equipment having an array of target wireless power transfer elements and having target wireless power transfer circuitry, wherein the source equipment and target equipment are configured to transfer power wirelessly from the source equipment to the target equipment using the array of source wireless power transfer elements, the source wireless power transfer circuitry, the array of target wireless power transfer elements, and the target wireless power transfer circuitry while aligning a wireless power null with the foreign object by using at least one of the target wireless power transfer elements to transmit wireless power signals while the source wireless power transfer elements are transmitting wireless power signals.

2. The system defined in claim 1 further comprising:
   at least one sensor, wherein the source equipment and target equipment is configured to use the sensor to locate the foreign object.

3. The system defined in claim 2 wherein the source equipment and target equipment are configured to transfer the power wirelessly from the source equipment to the target equipment using the array of source wireless power transfer elements, the source wireless power transfer circuitry, the array of target wireless power transfer elements, and the target wireless power transfer circuitry based at least partly on information from the sensor.

4. The system defined in claim 3 wherein the source equipment and target equipment are configured to transfer the power wirelessly from the source equipment to the target equipment based at least partly on channel estimates performed using the source and target wireless power transfer circuitry and the source and target arrays of wireless power transfer elements.

5. The system defined in claim 3 wherein the array of source wireless power transfer elements comprises an array of source coils, wherein the array of target wireless power transfer elements comprises an array of target coils, and wherein the source and target equipment are configured to transfer power wirelessly to the target equipment from the source equipment by directing wireless power towards a subset of target coils in the target equipment and away from the foreign object.

6. A method of transferring power wirelessly from source equipment having wireless power transfer circuitry and having an array of coils to at least one target coil in target equipment, comprising:
   performing channel estimation operations using the array of coils and the at least one target coil in the target equipment;
   determining wireless power transfer settings to use in transmitting signals with the array of coils using the wireless power transfer circuitry based at least partly on the channel estimation operations; and
   transmitting wireless power signals from the array of coils to the at least one target coil in the target equipment that is near-field coupled to the array of coils using the wireless power transfer settings, wherein performing the channel estimation operations using the array of coils and the at least one target coil in the target equipment comprises measuring a reflected impedance from the at least one target coil in the target equipment at each of the coils in the array of coils.

7. The method defined in claim 6 wherein performing the channel estimation operations using the array of coils and the at least one target coil in the target equipment comprises receiving signals at each of the coils in the array of coils with the wireless power transfer circuitry while transmitting signals from transmitter circuitry coupled to the at least one target coil in the target equipment.

8. The method defined in claim 7 wherein the at least one target coil in the target equipment comprises an array of target coils and wherein transmitting the wireless power signals comprises transmitting the wireless power signals from the array of coils in the source equipment to the array of target coils in the target equipment.

9. The method defined in claim 8 further comprising transmitting signals from at least one of the target coils in the array of target coils in the target equipment while transmitting the wireless power signals from the array of coils in the source equipment to the array of target coils in the target equipment.

10. The method defined in claim 9 further comprising:
    determining the location of a foreign object, wherein transmitting the wireless power signals from the array of coils comprises transmitting the wireless power signals from the array of coils based at least partly on the location of the foreign object.

11. The method defined in claim 10 wherein the source equipment includes at least one sensor and control circuitry and wherein determining the location of the foreign object comprises:
    using the control circuitry and the sensor to determine the location of the foreign object.

12. A method of transferring power wirelessly from source equipment having wireless power transfer circuitry and having an array of coils to at least one target coil in target equipment, comprising:
    performing channel estimation operations using the array of coils and the at least one target coil in the target equipment;
    determining wireless power transfer settings to use in transmitting signals with the array of coils using the wireless power transfer circuitry based at least partly on the channel estimation operations;
    transmitting wireless power signals from the array of coils to the at least one target coil in the target equipment that is near-field coupled to the array of coils using the wireless power transfer settings; and
    determining where a foreign object od located using the source equipment, wherein transmitting the wireless power signals from the array of coils comprises transmitting the wireless power signals from the array of coils based at least partly on where the foreign object is located.

13. A method of transferring power wirelessly from source equipment having wireless power transfer circuitry and having an array of coils to at least one target coil in target equipment, comprising:

performing channel estimation operations using the array of coils and the at least one target coil in the target equipment;

determining wireless power transfer settings to use in transmitting signals with the array of coils using the wireless power transfer circuitry based at least partly on the channel estimation operations; and transmitting wireless power signals from the array of coils to the at least one target coil in the target equipment that is near-field coupled to the array of coils using the wireless power transfer settings, wherein the target equipment comprises a vehicle and wherein transmitting the wireless power signals comprises transmitting the wireless power signals to the target coil in the vehicle.

14. A system for wirelessly transmitting power from a wireless power unit to a vehicle having at least one target antenna, comprising:

an array of antennas that are near-field coupled to the at least one target antenna;

at least one sensor configured to detect foreign objects; and wireless power transfer circuitry configured to transfer power wirelessly to the target antenna using the array of antennas based at least partly on information from the sensor about the foreign object.

15. The system defined in claim 14 wherein the array of antennas comprises an array of coils.

16. The system defined in claim 15 further comprising control circuitry configured to use the information from the sensor to determine where the foreign object is located, wherein the control circuitry is configured to halt wireless power transfer with the wireless power transfer circuitry based at least partly on the information.

17. The system defined in claim 14 wherein the at least one target antenna comprises one of an array of target antennas, wherein the system further comprises a transmitter coupled to a given one of the target antennas in the array of target antennas, and wherein the transmitter transmits signals through the given one of the target antennas while the wireless power transfer circuitry transfers power wirelessly to the vehicle.

18. The system defined in claim 17 wherein the transmitter is configured to transmit signals through the given one of the target antennas in the array of target antennas while the wireless power transfer circuitry transfers power wirelessly to the vehicle based at least partly on where the foreign object is located.

19. The system defined in claim 14 further comprising control circuitry configured to perform channel estimation operations using the array of antennas and the at least one target antenna in the vehicle.

* * * * *